United States Patent [19]

Kingston

[11] Patent Number: 4,969,160
[45] Date of Patent: Nov. 6, 1990

[54] DUAL CHANNEL CLOCK RECOVERY CIRCUIT

[75] Inventor: Samuel C. Kingston, Salt Lake City, Utah

[73] Assignee: Unisys Corporation, Blue Bell, Pa.

[21] Appl. No.: 408,542

[22] Filed: Aug. 16, 1982

[51] Int. Cl.⁵ .............................................. H04K 1/00
[52] U.S. Cl. ........................................ 375/1; 380/6; 375/113; 375/120
[58] Field of Search .................. 375/1, 106, 120, 113; 380/6

[56] References Cited

U.S. PATENT DOCUMENTS

| | | | |
|---|---|---|---|
| 3,959,601 | 5/1976 | Olevsky et al. | 375/120 |
| 4,339,824 | 7/1982 | Tanimoto | 375/113 |
| 4,375,693 | 3/1983 | Kuhn | 375/120 |
| 4,375,694 | 3/1983 | Kuhn | 375/120 |
| 4,472,817 | 9/1984 | Poklemba et al. | 375/113 |
| 4,475,208 | 10/1984 | Ricketts | 375/1 |

Primary Examiner—Salvatore Cangialosi
Attorney, Agent, or Firm—John B. Sowell; Robert S. Bramson; Mark T. Starr

[57] ABSTRACT

Apparatus is provided for detecting the presence of a periodically keyed random modulated signal source. Received signals are stepped down to an intermediate frequency and then applied to pairs of narrow bandpass filters. The output from pairs of the narrow bandpass filters are applied to mixers to provide difference frequency signals occurring at the clock rate of the periodically keyed random modulated signal. The clock signal is processed through recovery circuits including a detector and a comparator A signal is generated at the output of the comparator when the clock signal is detected above the background noise and interference, thus, indicating the presence of a periodically keyed random modulated signal source.

12 Claims, 11 Drawing Sheets

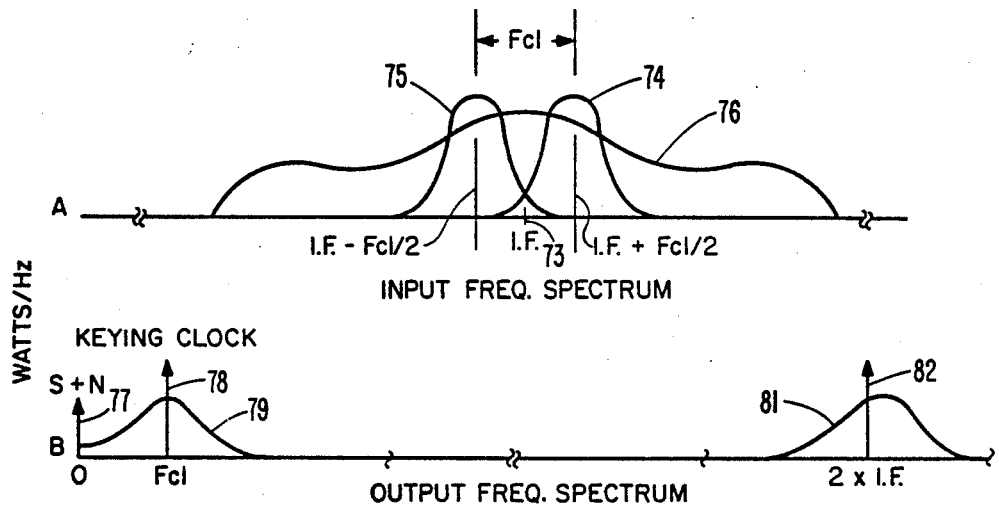
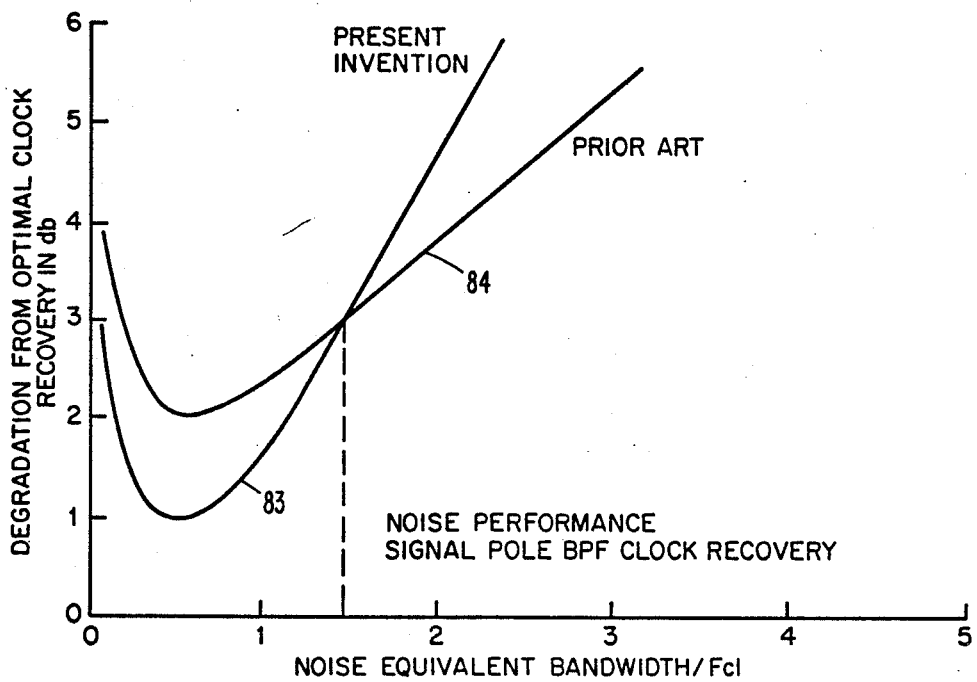

DUAL CHANNEL CLOCK RECOVERY CIRCUIT

BACKGROUND OF THE INVENTION

1. Field of the Invention

This invention relates to the detection of covert communication signals. More particularly, this invention relates to a novel circuit for detecting the presence of signals which typically are received at very low signal to interference and noise ratios.

2. Description of the Prior Art

The general class of signals to which the present invention is directed are commonly referred to as periodically keyed random modulated signals. For example, communications intelligence is often transmitted in coded form. One form or way of denying data access to the enemy is to transmit the data stream in direct sequence spread spectrum format. It is extremely difficult to detect data signals embedded or encoded in such spread spectrum format because the signal to noise ratio is so low as to make detection difficult.

Before it is possible to attempt to decode direct sequence spread spectrum coded data signals, it is necessary to determine that such coded signals are actually being transmitted. This invention is directed to the problem of detecting that such coded signals are being transmitted and is not directed to the problem of decoding such signals.

It has been suggested that radiometers or power signal detection devices be employed to determine if periodically keyed random modulated signals are being transmitted. When such signals are received at a receiver it is often impossible to distinguish them from the receiver noise, thermal background noise, other transmitted signals and interfering emission signals. It is possible that the power level of the signals which are to be detected do not exceed the background noise and interference signals mentioned above. Thus, it is often impossible to employ radiometers and power detection devices to detect the presence of low power periodically keyed random modulated signals.

When a radiometer is employed to detect the presence of a signal, then the threshold of the detector must be set very close to the signal levels. Changes in either the interference levels or the threshold levels will affect the sensitivity of the receiver which results in false alarms or reduced sensitivity. For example, if a threshold of a radiometer is set to detect the desired signal at a $-20$ db signal to noise ratio, then a one percent increase in interference level will cause a false alarm.

It has been suggested that since periodically keyed random modulated signals by definition change symbols at a fixed rate, it may be possible to detect the periodic repetition as a clock signal even though the data signal is not discernible.

One prior art attempt to recover the inherent clock in a periodically keyed modulated signal was to pass the received signal through a filter and then through a non-linear detector to provide power concentrated as a spectral line at the clock frequency. The output from the non-linear detector was then passed through a narrow bandpass filter tuned to the known clock frequency and that output was enveloped detected to provide an indication of the signal amplitude level as an output from the narrow bandpass filter. If the amplitude level output from the envelope detector exceeded the predetermined noise and interference reference threshold level then there is a high likelihood that a periodically keyed random modulated signal was being received.

These prior art devices have been found to require wide band filters to achieve desirable sensitivity. It is well-known that wide band width filters in such clock recovery circuits will also pass more high energy spectral lines, narrow band width signals and other noise which will be confused with the desired clock signal.

If narrow band width filters could be employed in clock recovery circuits, some of the aforementioned problems could be eliminated. Accordingly, it would be desirable to be able to detect the inherent keyed clock signal present in low signal to noise ratio periodically keyed random modulated signals employing narrow band width filters.

SUMMARY OF THE INVENTION

It is a principal object of the present invention to provide a novel clock recovery circuit for periodically keyed random modulated signals.

It is another principal object of the present invention to provide a dual channel clock recovery circuit for low signal to noise ratio periodically keyed random modulated signals.

It is another principal object of the present invention to provide a dual channel clock recovery circuit for low signal to noise ratio periodically keyed random modulated signals.

It is another object of the present invention to provide a circuit having dual channels comprising narrow bandpass filters to recover a clock signal from a periodically keyed random modulated signal.

It is another object of the present invention to provide means for adjusting and changing the frequency of the clock signal recovered to enable a search for an unknown clock frequency.

It is another object of the present invention to provide means for automatically generating a threshold reference voltage for establishing the background noise and interference level which is to be compared with the clock.

It is yet another object of the present invention to provide a new and more reliable circuit for detecting the absence or presence of periodically keyed random modulated signals.

According to these and other objects of the present invention there is provided a circuit for detecting the presence or absence of a periodically keyed random modulated signal which includes a power splitter adapted to supply two separate and distinct channels with the source of periodically keyed modulated signals. The separate channels contain narrow bandpass filters. One is tuned to a frequency higher than the expected center frequency of the periodically keyed random modulated signals and the other bandpass filter is tuned to a frequency lower than the expected center frequency. The distance between centers of the narrow bandpass filters is approximately the clock frequency to be detected. The output from the narrow bandpass filters is connected to a mixer to provide an output signal representative of a clock having a frequency equal to said periodically keyed random modulated signals. The output of the mixer is then analyzed so as to determine the presence or absence of the inherent clock signal which would indicate that periodically keyed random modulated signals are being transmitted.

BRIEF DESCRIPTION OF THE DRAWINGS

FIG. 5 is a diagram of input and output signal frequency spectrums for the circuit of FIG. 4;

FIG. 6 is a diagram of performance versus bandwith for the circuits of FIGS. 3 and 4 employing single pole I.F. filters;

DESCRIPTION OF THE PREFERRED EMBODIMENT

Figure 1:
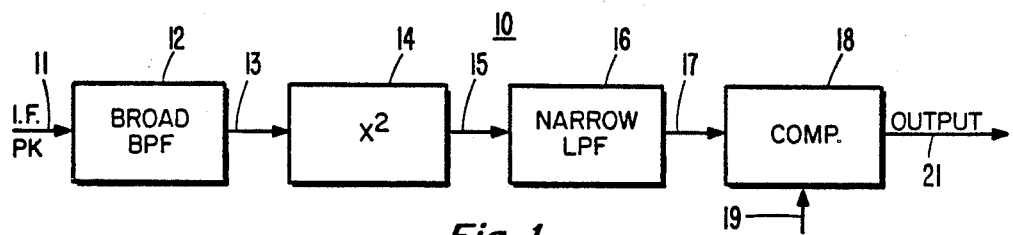
FIG. 1 is a block diagram showing a prior art radiometer for use in measuring power in selected frequency bands.

Refer to FIG. 1 showing in block diagram form the components of the prior art radiometer 10. An input signal on line 11 contains the intermediate frequency signal which is to be searched for the absence or presence of a periodically keyed randomly modulated signal. The intermediate frequency signal on line 11 is applied to the broad bandpass filter 12 which removes the frequency components on either side of the band which is being searched. The output from bandpass filter 12 on line 13 is then detected in a square law detector 14 to provide an output on line 15 which is a measure of the power of the signal being passed through filter 12. The power signal on line 15 is passed through a narrow low pass filter 16 to smooth the power output signal on line 15. The smoothed power measurement is applied via line 17 to a comparator 18 which is provided with a voltage threshold reference on line 19. When the power level on input line 17 exceeds the predetermined voltage threshold level on line 19 a signal is provided on output line 21 which indicates that more power is being received at line 11 than can be accounted for by the background noise and interference signals. The problem with this prior art device is that it does not give a positive indication that a periodically keyed random modulated signal is being received.

Figure 2:
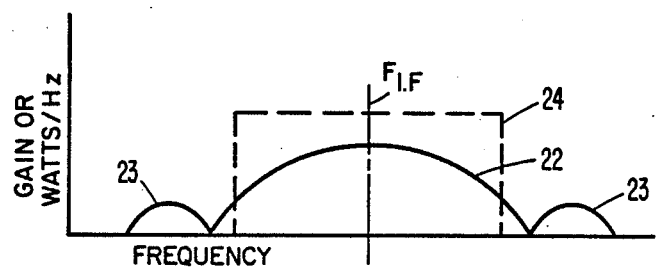
FIG. 2 is a power spectral plot showing a typical periodically keyed random modulated signal of the type to be detected.

Refer now to FIG. 2 showing a power spectral plot of a typically periodically keyed random modulated signal of the type to be detected. The main lobe 22 has an abscissa or X axis frequency base plotted versus the watts per hertz as the Y axis. The spectral plot shows side lobes 23 which are not to be detected by the present invention. The center frequency of the main lobe 22 is designated by $F_{if}$ which is the intermediate frequency of the signals being received at the input to the filter 12. The frequency response of a typical broad bandpass filter is shown in phantom lines at 24. The filter frequency response 24 is superimposed on main lobe 22 at the same frequency and as a function of the gain from input to output of the filter. Thus, if the filter 12 of FIG. 1 has the same bandpass as the filter frequency response 24, then the output signal on line 13 will be restricted to the frequency shown. When high energy interference signals or noise appear in the frequency spectrum embraced by the filter frequency response 24 of the broad bandpass filter 12, then the signal may exceed the reference voltage on line 19 and cause an output on line 21 which is a false signal.

Figure 3:
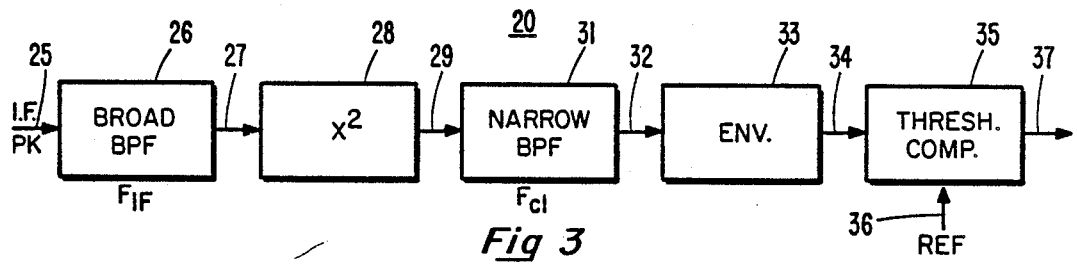
FIG. 3 is a block diagram showing a prior art single channel circuit for recovering the clock signal from a randomly modulated intermediate frequency signal.

Refer to FIG. 3 showing a prior art single channel clock recovery circuit. The intermediate frequency signal to be detected is shown being applied via line 25 to a broad bandpass filter 26 similar to filter 12. The output on line 27 is applied to a square law detector 28 similar to detector 14. The output from square law detector 28 on line 29 is applied to a narrow bandpass filter 31 to remove the interference and noise signals close to the clock frequency spectral line. The output or tone signal from the narrow bandpass filter 31 on line 32 is applied to the envelope detector 33 to provide an amplitude output signal on line 34 indicative of the tone signal being enveloped detected. The amplitude signal on line 34 is applied to the threshold comparator 35 which is also supplied with a reference voltage threshold input via line 36. When the amplitude signal on input line 34 exceeds the reference voltage on line 36 the threshold comparator 35 produces an output signal on line 37 indicative of the presence of a periodically keyed random modulated signal being present at the input line 25. As explained herein above, with reference to FIGS. 1 and 2 it is not desirable to have to employ broad bandpass filters 12 and 26 in order to detect the main lobe of the signal to be detected. When such broad bandpass filters are employed the incidents of false indications increases substantially.

Figure 4:
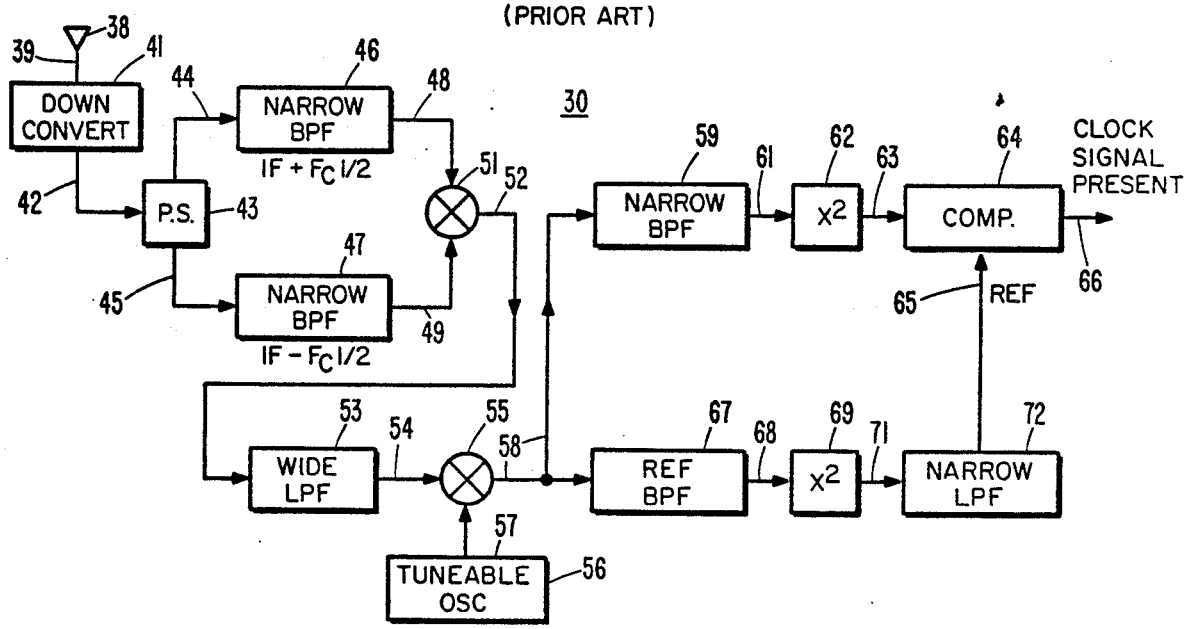
FIG. 4 is a block diagram showing the present invention dual channel circuit for recovering the clock signal from a periodically keyed random modulated signal.

Refer now to FIG. 4 showing a block diagram of the present invention employing dual channel circuits with narrow bandpass filters to recover the clock signal from a periodically keyed random modulated signal. The clock recovery circuit 30 is shown having an antenna 38 connected via line 39 to a down converter 41 of the type which modulates the incoming signal to provide an intermediate frequency signal on line 42. The signal on line 42 is divided in power splitter 43 to provide identical signals on lines 44 and 45 which are applied to the narrow bandpass filters 46 and 47. The narrow bandpass filter 46 is tuned to provide an intermediate frequency plus half of the clock frequency on output line 48. The narrow bandpass filter 47 is tuned to provide the intermediate frequency minus half the clock frequency on output line 49. The signals on lines 48 and 49 are applied to mixer 51 to produce an output on line 52 which is representative of the inherent clock frequency of the periodically keyed random modulated signal if such signal is present. If the periodically keyed random modulated signal is not present at the input line 42 then the only signal present on line 52 is the noise and interference signals. Assuming that a periodically keyed random modulated signal was present then there is a clock signal on line 52 which is applied to the wide low pass filter 53 to provide the different frequencies from the mixer 51 as an output on line 54. The difference frequency on line 54 is applied to mixer 55. A tuneable oscillator 56 is connected to mixer 55 via line 57 to provide an output on line 58 representative of a clock frequency which has been changed slightly by the tuneable oscillator 56. The tuneable oscillator 56 permits the circuit 30 to be employed to search for unknown clock frequencies over a range approximate equal to the range of the passband of the bandpass filters 46 and 47. The modified clock signal on line 58 is applied to the narrow bandpass filter 59. Narrow bandpass filter 59 is tuned to the center frequency of the clock signal on line 58 whereas the center frequency of the aforementioned narrow bandpass filters 46 and 47 is tuned to the center frequency of the intermediate frequency plus or minus half of the clock frequency. Assuming that the frequency of the clock on line 59 is tuned to the center of the narrow bandpass filter 59 an output on line 61 is produced which is a high amplitude signal assuming that the periodically keyed random modulated signal is present. The high amplitude signal on line 61 is applied to the square law detector 62 to provide a signal on line 63 which is proportional to the power of the bandpass filter 59. The signal on line 63 is applied to the comparator 64 which is also provided with a reference voltage threshold signal on line 65. When the signal on line 63 exceeds the voltage threshold level on line 65 an output signal will be produced on line 66 which is indicative of the presence of a clock signal thus indicating that a periodically keyed random modulated signal was also present at the input IF line 42.

Another feature of the present invention is the provision for generating an automatic voltage threshold reference level. The line 58 on which the modified clock signal appears is also applied to a reference bandpass filter 67 to produce an output on line 68. The reference bandpass filter 67 is tuned to a portion of the frequency spectrum which does not contain the modified clock frequency on line 58 thus the output on lines 68 is indicative of the noise background and interference level being produced. The background noise and threshold level on line 68 is applied to a square law detector 69 to produce a power output signal on line 71 which is applied to a narrow low pass filter 72 which smooths the input signal on line 71 and provides the desired referenced voltage on line 65 which is applied to the comparator 64.

Refer now to FIG. 5 which is a diagram showing the input signal frequency spectrum and the output signal frequency spectrum for the circuit of FIG. 4. The X axes of FIGS. 5a and 5b are frequency based and the Y axis is the signal strength and watts per hertz. In FIG. 5a the center of the frequency spectrum of this curve is the intermediate frequency shown at point 73. This point is representative of the frequency of this signal being applied at line 42 to power splitter 43. The filter response curve 74 is indicative of filter 46 which has its frequency tuned to the center of a frequency indicated by the intermediate frequency plus half of the clock frequency. The response curve 75 is indicative of filter 47 which has its center frequency tuned to the intermediate frequency minus half the clock frequency.

In the preferred embodiment of the present invention the center of the frequency response curves 74 and 75 are separated by the clock frequency $F_{CL}$. If the frequency response curves 74 and 75 are either closer together or further apart than the separation shown by the clock frequency the power in the clock line which is available at line 52 is degraded. The input power spectrum at line 42 is shown as curve 76. It will be noted that any reasonable operable combination of narrow bandpass filters will produce an overlap of the two response curves 74, 75 at the intermediate frequency point 73. This overlap will cause a DC power component to appear in the output of mixer 51 on line 52 and is preferably made as small as possible.

Refer now to FIG. 5b showing the output freqency spectrum. At the zero frequency point a spectral line or DC component 77 is shown which is indicative of the total power in the overlapping region of the filter response curve 74, 75. The keying clock spectral line 78 is shown at the clock frequency $F_{CL}$ and its magnitude is shown greater than the DC spectral line 77. However, since there is no interference noise component on the spectral line 78 it is entirely possible that the DC spectral line 77 may be greater in magnitude than the keying clock spectral line 78. The waveforms 79 represents the residual power spectrum due to the interference signals noise and background etc. and appears at the output of mixer 51 on line 52. It will be noted that the narrow bandpass filter 59 is employed to filter out as much of this residual power spectrum 79 as possible. Waveform 81 which represents the sum frequency power spectrum also appears on output line 52. The power spectrum waveform 81 is removed by the wide low pass filter 53. Having explained the waveforms associated with FIGS. 5a and 5b it will be recognized that the filter response curve 74 and 75 may be made very narrow so as to eliminate the interference spectral lines which will be explained in more detail hereinafter.

Spectral line 82 is representative of the spectral line which will appear at twice the intermediate frequencies for some forms of transmission such as when the signal is bi-phased shift keyed.

FIG. 6 is a curve which is adapted to illustrate that the degradation of the input power to the clock recovery circuit 30 of FIG. 4 is much less than the degradation of the input power to the prior art clock recovery circuit 20 of FIG. 3 for low values of the bandwidth of the filters employed in the respective circuits. Curve 83 represents the degradation of the input power when the clock recovery circuit FIG. 4 is employed. It will be noted that the curve 83 drops substantially to one decibel and does not exceed three decibels until the noise equivalent bandwidth is exceeding approximately one and a half times the clock frequency. It will be noted that the curve 84 which is associated with the degradation of power input to FIG. 3 stays substantially higher than curve 84 until it reaches the noise equivalent bandwidth of approximately one and a half times the clock frequency. Thus, it will be appreciated that the curves of FIG. 6 show that the degradation of the improved clock recovery circuit is much less than the prior art clock recovery circuits over the desired operable IF bandwidths. The curves 83, 84 of FIG. 6 were derived assuming that a single pole bandpass filter was employed in the respective circuits.

Figure 7:
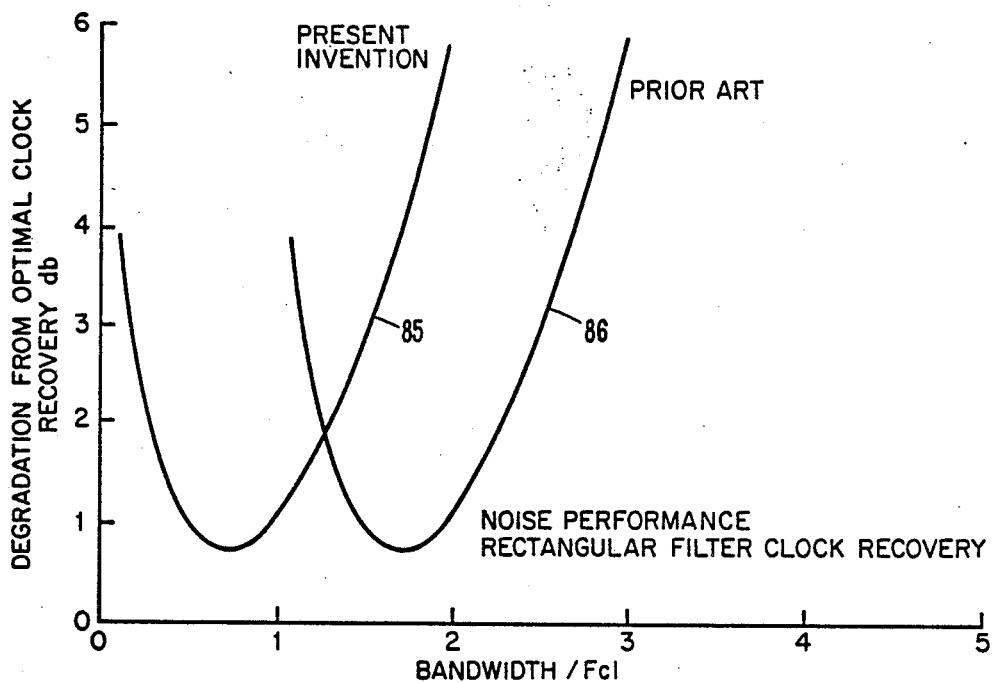
FIG. 7 is a diagram of performance versus bandwidth for the circuits of FIGS. 3 and 4 employing rectangular I.F. filters.

Refer now to FIG. 7 which is a diagram of the performance versus the bandwidth for the circuits of FIGS. 3 and 4 when rectangular IF filters are employed in the respective circuits. Curve 85 represents the degradation of the input power signal of the present invention circuit 30 of FIG. 4. It will be noted that the degradation of the signal is less than one decibel at the operating frequency of approximately one times the clock frequency and does not exceed three decibels degradation until approximately one and one half times the clock frequency. However, when employing the rectangular filters in the prior art circuit 20 shown in FIG. 3 the degradation of the input signal at one times the clock frequency shown in curve 86 is over three decibels and does not reduce to a point below one decibel until after one and a half times the clock frequency is obtained. FIG. 7 illustrates the ability to achieve acceptable noise performance results employing very narrow intermediate frequency bandwidth filters and also shows that the prior art clock recovery circuits require relatively broad bandpass filters to achieve equivalent white noise sensitivity. Stated differently, this diagram of curves in FIG. 7 shows that the same amount of power is obtained by the new circuit of FIG. 4 without broadening the bandpass filter spectrum which would also permit the introduction of extraneous spectral lines and noise in the output being detected.

Figure 8:
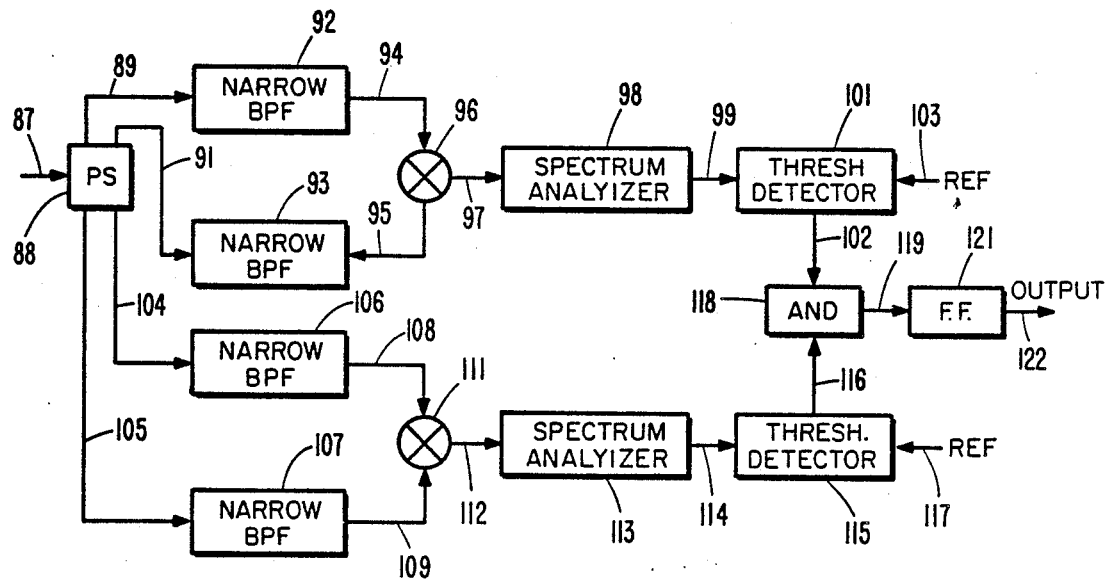
FIG. 8 is a block diagram of the present invention showing a modified dual channel circuit embodiment for recovering the clock signal from a randomly modulated intermediate frequency signal.

Refer now to FIG. 8 showing another form of the present invention. The block diagram of FIG. 8 is a modification of the novel clock recovery circuit of FIG. 4. FIG. 4 employed two bandpass filters in a single dual channel arrangement whereas FIG. 8 illustrates a plurality of dual channels. The down converted intermediate frequency signal to be detected is present on input line 87 and is applied to power splitter or divider 88. The output on lines 89, 91 is applied to a first pair of bandpass filters 92, 93 which operate in an identical manner as explained hereinbefore with respect to the narrow bandpass filters 46, 47 of FIG. 4. The output from the narrow bandpass filters 92, 93 on lines 94, 95 is applied to the first mixer 96. The recovered clock signal on line 97 is applied to a first spectrum analyzer 98 which analyzes the output frequency spectrum similar to that explained with regard to FIG. 5b. The output of the spectrum analyzer 98 on line 99 is applied to a threshold detector 101 to produce a signal output on line 102 when the input signal on line 99 exceeds the referened voltage on line 103.

Output lines 104 and 105 from power splitter 88 are applied to a second pair of narrow bandpass filters 106, 107 to produce filtered outputs on lines 108, 109 which are applied to the second mixer 111. The output of the second mixer 111 on line 112 is representative of an output frequency spectrum similar to that explained with regards to FIG. 5b. The output of the second spectrum analyzer 113 on line 114 is applied to the threshold detector 115 to produce an output on line 116 when the input on line 114 exceeds the referenced voltage on line 117. The outputs of the threshold detectors 101 and 115 are applied to AND gate 118 to produce an output on line 119 when signals are present on both lines 102 and 116. The output from AND gate 118 on line 119 is employed to set the flip-flop 121 to produce an output on line 122. Flip-flop 121 is representative of any type of device which will sample and hold the signal on line 119. Thus it will be understood that flip-flop 121 may be a monostable flip-flop or it may be reset by means not shown. The bandpass filters 92, 93 are similar to those explained hereinbefore with reference to FIG. 4. Similarly, the bandpass filters 106, 107 are tuned to different frequency from the frequency of the bandpass filters 92, 93 and operate in a manner similar to that explained with regards to FIG. 4.

Figure 9:
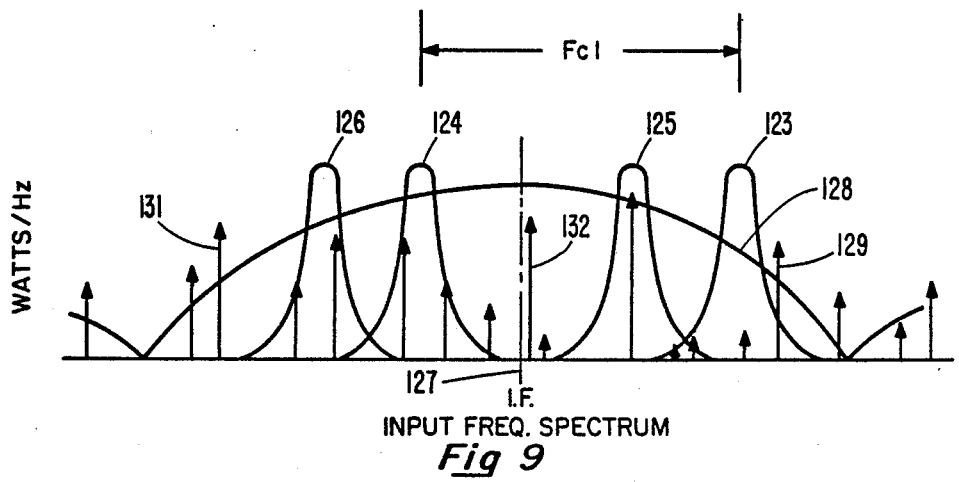
FIG. 9 is a diagram of the input signal frequency spectrum for the circuit of FIG. 8.

Refer now to FIG. 9 for an explanation of the operation of the narrow bandpass filters employed in FIG. 8. FIG. 9 is a diagram of the input signal frequency spectrum for the circuit of FIG. 8. The filter response curve 123 is representative of the output from narrow bandpass filter 92. The filter response curve 124 is representative of the output from narrow bandpass filter 93. The filter response curve 125 is representative of the output of narrow bandpass filter 106 and the filter response curve 126 is representative of the output narrow bandpass filter 107. It will be understood by examination of FIG. 9 that the narrow bandpass filters of the circuit of FIG. 8 are all tuned to a frequency which is very close to the intermediate frequency 127 and that the separation of the respective pairs of filters 123, 124 and 125, 126 are separated by the clock frequency shown as $F_{CL}$. The filter response curves 123, 124, 125 and 126 illustrate clearly that the narrow bandpass filters 92, 93, 106 and 107 may all be operably placed within the main lobe of the input power spectrum 128. Superimposed on FIG. 9 there are shown spectral lines which are representative of narrow band interferers. The interferers 129, 132, 131, etc. are representative of very narrow band signals which occur at different frequencies close to the intermediate frequency. By employing the very narrow band filters in the FIG. 8 embodiment it is possible to eliminate the coincidence of these narrow band interferers with the filter response curves. While it is not possible to eliminate the coincidence of narrow band interferers in every incident, it is possible to eliminate a majority of such interferers. It will be noted that the interferers illustrated in FIG. 9 are random and completely independent of the filter response curves. These interferers may be fixed or may be transient. Thus, using two or more sets of filters it is possible to eliminate false alarms because the random interferers do not occur in both sets of filters simultaneously.

Figure 10:
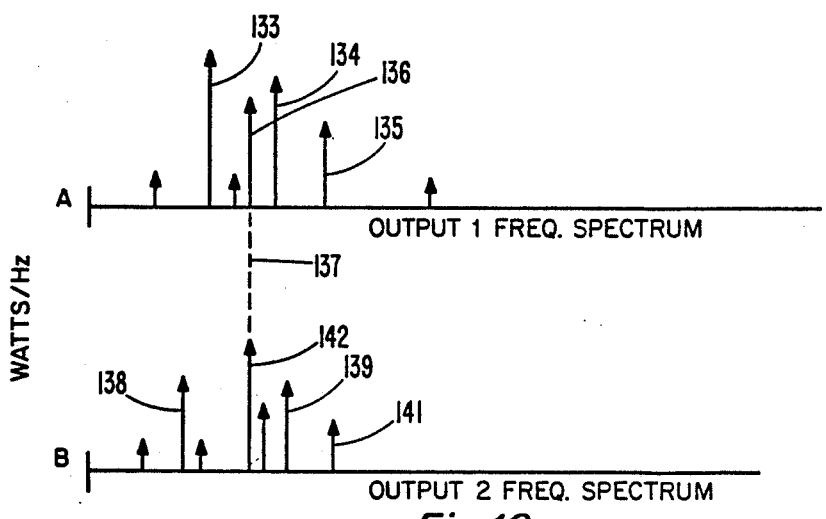
FIG. 10 is a diagram of the output signal frequency spectrums for the circuit of FIG. 8.

Refer now to FIGS. 10a and 10b showing a diagram of the output signal frequency spectrums for the circuit of FIG. 8. The spectral lines interferers 133, 134, 135, etc. are the spectral lines which are appearing at the output of spectrum analyzer 98 on line 99. It will be understood that the magnitude of the spectral lines may have reached the point where they will exceed the reference threshold voltage at line 103 and produce a false clock indication on output line 102. A clock spectral line 136 is shown appearing in FIG. 10a at the exact coincident frequency of the clock which is shown at frequency line 137.

The spectral lines 138, 139 and 141 are shown as interferers or spectral lines which appear at the output of spectrum analyzer 113 on line 114. These spectral lines are shown being large enough to create a false alarm output from the threshold detector 115 on line 116. Further, the clock spectral line 142 is shown being coincident with the frequency line 137. By combining the outputs from the threshold detectors 101 and 115 in AND gate 118 it is possible to isolate the clock spectral lines 136 and 142 from the interfering spectral lines 133 to 135 and 138 to 141. Thus, it will be appeciated that the random interfering spectral lines do not appear coincident with each other in normal operation and the probability of their occurring simultaneously is very low, thus, the number of false alarms produced at the output line 122 are substantially reduced by employing two or more dual channels as shown in FIG. 8.

Figure 11:
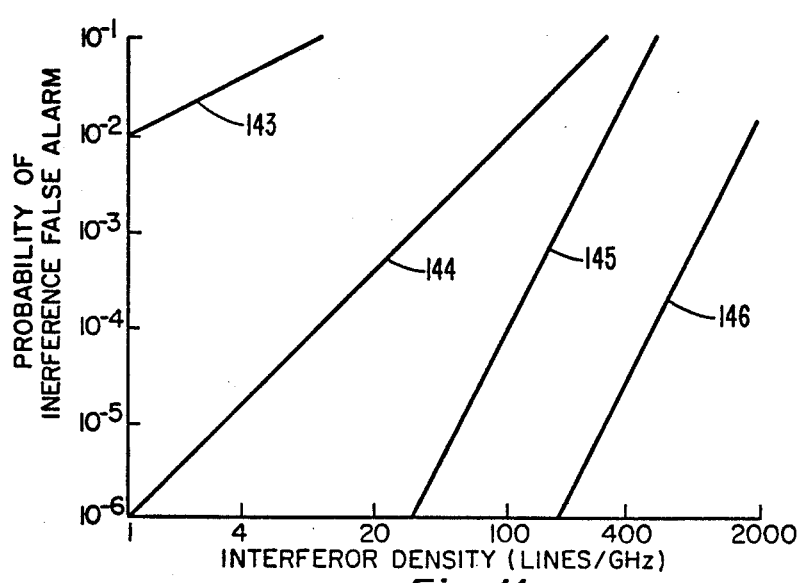
FIG. 11 is a diagram showing the probability of narrow band interference generating a false alarm in the circuits of FIGS. 1, 3, 4 and 8.

Refer now to FIG. 11 showing a diagram of the probability of the narrow band interferers generating a false alarm. Curve 143 of FIG. 11 shows the probability of generating an interference false alarm when the radiometer circuit 10 of FIG. 1 is employed. It will be understood that any narrow band interferer which passes through the radiometer circuit of FIG. 1 and is of sufficient magnitude to produce an output will also produce a false alarm.

Curve 144 shows the probability of the clock recovery circuits associated with FIGS. 3 and 4 producing a false alarm. When two interferers of sufficient magnitude occur and are separated by the clock frequency an interference false alarm can be produced with the clock recovery circuits of FIG. 3 and 4.

Curve 145 shows the probability of producing an interference false alarm when employing the novel circuit of FIG. 8. This assumes that at the FIG. 8 spectrum analyzers 98 and 113 are basically single bandpass filters in their mode of operation. When the spectrum analyzers 98 and 113 are replaced with a more complex and expensive multipoint spectrum analyzer, the curve 146 is more representative of the probability of interference of false alarms being produced.

Having explained a simplified preferred embodiment dual channel narrow bandpass filter clock recovery circuit it will be appreciated that more expensive forms of bandpass filters may be employed in the circuits shown. Further, it is to be understood that FIG. 8 is designed to show that a plurality of dual narrow band filter channels may be employed and the present invention is not restricted to only two pairs of narrow bandpass filters. It is entirely possible that hundreds of pairs of narrow bandpass filters may be employed if the hardware implementation demands the improved performance.

I claim:

1. A circuit for detecting the presence or absence of a periodically keyed random modulated signal source, comprising:
   receiver means for receiving periodically keyed random modulated signals,
   means for down converting said received signals to an intermediate frequency source,
   a power splitter coupled to said intermediate frequency source,
   a first bandpass filter coupled to said power splitter,
   said first bandpass filter being adapted to provide output signals slightly higher than said intermediate frequency,
   a second bandpass filter coupled to said power splitter,
   said second bandpass filter being adapted to provide output signals slightly lower than said intermediate frequency,
   a first mixer coupled to said bandpass output signals for producing a sum and difference frequency signal,
   a third bandpass filter coupled to said difference frequency signals from said first mixer,
   a square law detector coupled to the output of said third bandpass filter, and
   a comparator coupled to the output of said square law detector for determining if the power level detected is higher than a predetermined voltage reference level which is representative of the presence of periodically keyed random modulated signals, at said receiver means.

2. A circuit for detecting as set forth in claim 1 which further includes:
   a second mixer coupled to the output of said first mixer,
   a tunable oscillator connected to an input of said second mixer,
   said third bandpass filter being connected to the output of said second mixer,
   said second mixer and said tunable oscillator being adapted to change said difference frequency signal being applied to said third bandpass filter.

3. A circuit for detecting as set forth in claim 2 which further includes:
   means for generating said predetermined voltage reference,
   said means for generating said predetermined voltage reference being connected to said comparator and to said second mixer.

4. A circuit for detecting as set forth in claim 1 wherein said periodically keyed random modulated signal is keyed at a fixed frequency, and
   wherein said third bandpass filter is a narrow bandpass filter tuned to said fixed frequency,
   whereby, said third bandpass filter passes signals at a frequency representative of a clock at said fixed frequency when said periodically keyed random modulated signal is present at said receiver means.

5. A circuit for detecting as set forth in claim 4 wherein said square law detector coupled to the output of said third bandpass filter is tuned to produce a larger power output to said comparator when said clock signals are present at said receiver means.

6. A circuit for detecting as set forth in claim 5 which further includes:
   means for changing said fixed frequency of said clock coupled to the output of said first mixer,
   said means for changing said fixed frequency of said clock being coupled to said third bandpass filter,
   whereby the clock frequency is adjusted to the frequency of said tuned narrow bandpass filter.

7. A circuit for detecting the presence or absence of a periodically keyed random modulated signal source, comprising:
   a source of periodically keyed random modulated signals converted down to intermediate frequency signals,
   a power splitter coupled to said intermediate frequency signals,
   a first pair of bandpass filters coupled to said power splitter,
   one of said bandpass filters of each pair being tuned to a frequency higher than said intermediate frequency of said periodically keyed random modulated signals,
   the other of said bandpass filters of each pair being tuned to a frequency lower than said intermediate frequency of said periodically keyed random modulated signals,
   mixer means coupled to the output of said each pair of said bandpass filters for producing signals representative of clocks having a fixed frequency equal to said periodically keyed random modulated signals, and
   means coupled to said mixer means for analyzing said signals representative of said clocks to determine the absence or presence of said clock signals, said clock signals being indicative of the presence of said periodically keyed random modulated signal.

8. A circuit for detecting as set forth in claim 7 wherein said means for analyzing said signals representative of said clocks comprises:
   a bandpass filter coupled to said mixer,
   a square law detector coupled to the output of said bandpass filter, and a comparator coupled to the output of said square law detector for indicating the absence or presence of said clock signal.

9. A circuit for detecting as set forth in claim 7 which further includes:
  a second pair of bandpass filters coupled to said power splitter,
  said second pair of bandpass filters being tuned to a slightly different frequency from said first pair of bandpass filters,
  said mixer means including a first mixer coupled to said first pair of bandpass filters and a second mixer coupled to the output of said second pair of bandpass filters for producing a signal representative of a clock having a fixed frequency equal to said periodically keyed random modulated signals.

10. A circuit for detecting as set forth in claim 9 wherein said means coupled to said mixer means for analyzing said signal representative of said clock comprises:
  a first spectrum analyzer coupled to said first mixer,
  a second spectrum analyzer coupled to said second mixer,
  and means for determining the absence or presence of said clock signal in the output of both said spectrum analyzers.

11. A circuit for detecting as set forth in claim 10 wherein said means coupled to said mixer means for analyzing said signal representative of said clock comprises:
  an AND gate coupled to said first and second spectrum analyzers, and
  settable means for detecting the output of said AND gate.

12. A circuit as set forth in claim 11 which further includes:
  threshold detectors connected to said AND gate and said spectrum analyzers.

* * * * *